(12) United States Patent
Kang et al.

(10) Patent No.: US 11,772,143 B2
(45) Date of Patent: Oct. 3, 2023

(54) MICRO FIBER AND METHOD OF MANUFACTURING SAME

(71) Applicants: Hyundai Motor Company, Seoul (KR); Kia Motors Corporation, Seoul (KR); Industrial Cooperation Foundation Jeonbuk National University, Jeoliabuk-do (KR)

(72) Inventors: Gun Kang, Seoul (KR); Won Jin Seo, Gyeonggi-do (KR); Mi Jung Yun, Gyeonggi-do (KR); Hong Chan Jeon, Seoul (KR); Sung June Park, Jeollabuk-do (KR); Sang Min Lee, Jeollabuk-do (KR); Min Jae Choe, Jeollabuk-do (KR); Eun Seon Kim, Jeollabuk-do (KR)

(73) Assignees: Hyundai Motor Company, Seoul (KR); Kia Motors Corporation, Seoul (KR); Industrial Cooperation Foundation Jeonbuk National University, Jeoliabuk-do (KR)

( * ) Notice: Subject to any disclaimer, the term of this patent is extended or adjusted under 35 U.S.C. 154(b) by 143 days.

(21) Appl. No.: 17/134,714

(22) Filed: Dec. 28, 2020

(65) Prior Publication Data
US 2022/0032353 A1    Feb. 3, 2022

(30) Foreign Application Priority Data

Jul. 29, 2020  (KR) .................. 10-2020-0094158

(51) Int. Cl.
*B22D 21/00*   (2006.01)
*B22D 27/00*   (2006.01)
*B22D 27/04*   (2006.01)
*B21C 23/26*   (2006.01)
*B21C 37/04*   (2006.01)
*B22D 11/00*   (2006.01)

(52) U.S. Cl.
CPC ............ *B21C 23/26* (2013.01); *B21C 37/042* (2013.01); *B21C 37/045* (2013.01); *B22D 11/005* (2013.01); *B22D 21/00* (2013.01); *B22D 27/00* (2013.01); *B22D 27/04* (2013.01)

(58) Field of Classification Search
CPC .... B22D 21/00; B22D 21/007; B22D 21/027; H01B 1/02
See application file for complete search history.

(56) References Cited

FOREIGN PATENT DOCUMENTS

| CN | 109338716 A | * | 2/2019 | |
| CN | 110729072 A | * | 1/2020 | ............ H01B 13/00 |
| KR | 10-2018-0011782 A | | 2/2018 | |

OTHER PUBLICATIONS

Yu et al., "Simultaneous Fast Deformation and Solidification in Supercooled Liquid Gallium at Room Temperature", 2017, Advanced Engineering Materials. (Year: 2017).*

(Continued)

*Primary Examiner* — Kevin E Yoon
*Assistant Examiner* — Jacky Yuen
(74) *Attorney, Agent, or Firm* — Fox Rothschild LLP (57) ABSTRACT

Disclosed are a micro fiber and a method of manufacturing the micro fiber are proposed. The micro fiber may be manufactured by controlling thickness and Young's modulus thereof using hollow fiber.

12 Claims, 5 Drawing Sheets

(56) References Cited

OTHER PUBLICATIONS

Tonnazzini et al., "Variable Stiffness Fiber with Self-Healing Capability", 2016, Advanced Materials. (Year: 2016).*
Khondoker et al., "Fabrication methods and applications of microstructured gallium based liquid metal alloys", 2016, Smart Materials and Structures. (Year: 2016).*
S. Park et al., "Ultrastretchable Elastic Shape Memorty Fibers with Electrical Conductivity", Advanced Science, vol. 6, 1-7 (2019).
Y. Lin et al., "Drawing liquid metal wires at room temperature", Extreme Mechanics Letters, 7 (2016) 55-63.

* cited by examiner

MICRO FIBER AND METHOD OF MANUFACTURING SAME

CROSS REFERENCE TO RELATED APPLICATION

The present application claims priority to Korean Patent Application No. 10-2020-0094158, filed Jul. 29, 2020, the entire contents of which are incorporated herein for all purposes by this reference.

TECHNICAL FIELD

The present invention relates to a micro fiber and a method of manufacturing the same. Particularly, the micro fiber may be manufactured by controlling thickness and Young's modulus thereof using hollow fiber.

BACKGROUND

Conductive fiber is a material that is used to develop electronic clothing and electronic materials requiring durability. Conventional metal wires have stable properties in terms of conductivity, shape stability, and durability, but have a drawback that they cannot be used for a material requiring flexibility, such as a newly developed flexible display.

A conventional hot forming process for metal refers to a process in which heat or pressure is applied to a raw material to form a desired shape. A metal raw material goes through a process in which it is heated in a liquid or semi-solid state, injected into a mold, and hardened to make a product. This process requires a lot of energy so as to maintain the raw material at high temperature, and essentially requires a process for hardening and cooling the product. Thus, this process has a drawback that it is more expensive and takes more time as compared with a method proposed in the present invention.

The foregoing is intended merely to aid in the understanding of the background of the present invention, and is not intended to mean that the present invention falls within the purview of the related art that is already known to those skilled in the art.

SUMMARY

In preferred aspect, provided is a metal wire that is manufactured by controlling thickness through drawing at room temperature.

The objective of the present invention is not limited to the foregoing. The objective of the present invention will become more apparent from the following description, and will be realized by means described in claims and combinations thereof.

In an aspect, provided is a method of manufacturing a micro fiber, which may include: preparing a hollow fiber; injecting a liquid metal into the hollow fiber; forming a composite fiber by crystallizing the liquid metal to form metal wire; drawing the composite fiber; and removing the hollow fiber from the composite fiber. The composite fiber may include a core part including the metal wire, and a sheath part including the hollow fiber.

The term "hollow fiber" as used herein refers to a fiber that may have a structure that has an inner empty space, such as channel or hole, surrounded by a fiber material or other components such as filler surrounding the inner space. Preferred hollow fiber may include a core as a form of hole or channel without a filler material or other components.

The term "liquid metal" as used herein refers to a metal or a metal alloy which is present in a liquid state at or near room temperature (e.g., a temperature as around 15 to 25° C.). Exemplary liquid metal includes mercury, gallium and gallium-based alloys.

The hollow fiber may include silicone.

The Young's modulus of the hollow fiber may range from about 0.5 M Pa to about 5.0 MPa.

An inner diameter of the hollow fiber may range from about 0.2 mm to about 2.0 mm.

A melting point of the liquid metal may be about 30° C. or less, and specific resistivity thereof may be about $2.0 \times 10^{-7}$ Ωm or less.

The liquid metal may be injected into a hole of the hollow fiber.

The injected liquid metal may be in a super-cooled state.

The liquid metal may include gallium or alloy including gallium.

A seed crystal may be inserted into the injected liquid metal to perform crystallization.

The seed crystal may be provided in a shape of copper wire coated with the same metal as metal included in the liquid metal.

At the drawing of the composite fiber, the metal wire may be locally melted and thereby the composite fiber may be drawn.

The drawing of the composite fiber may include melting a part of the metal wire other than both ends thereof; pulling the both ends to stretch the metal wire; and crystallizing the stretched metal wire.

The melting may be performed through any one of Joule heating, induction heating, and body heating.

A diameter of the metal wire included in the drawn composite fiber may range from 100 μm to 700 μm.

The composite fiber may be drawn by about 300% to 500%.

The present invention provides micro fiber manufactured by the method described herein.

A diameter of the micro fiber may range from 100 μm to 700 μm, and the Young's modulus of the micro fiber may range from about 600 MPa to about 800 MPa.

According to various exemplary embodiments the present invention, a metal wire that is controlled in thickness through drawing at room temperature may be provided.

The effect of the present invention is not limited to the foregoing. It should be understood that the effect of the present invention embraces all effects deducible from the following description.

Other aspects of the invention are disclosed infra.

BRIEF DESCRIPTION OF THE DRAWINGS

The above and other objectives, features, and other advantages of the present invention will be more clearly understood from the following detailed description when taken conjointly with the accompanying drawings, in which.

DETAILED DESCRIPTION OF THE INVENTION

The above and other objectives, features, and advantages of the present invention will be easily understood from the following preferred embodiments in conjunction with the accompanying drawings. However, the invention may be embodied in different forms without being limited to the embodiments set forth herein. Rather, the embodiments disclosed herein are provided to make the invention thorough and complete and to sufficiently convey the spirit of the present invention to those skilled in the art.

Like reference numerals refer to like parts throughout various figures and embodiments of the present invention. The sizes of elements in the accompanying drawings may be exaggerated for clarity of illustration. It will be understood that, although the terms "first", "second", etc. may be used herein to describe various elements, these elements should not be limited by these terms. These terms are only used to distinguish one element from another element. For instance, a first element could be termed a second element without departing from the teachings of the present invention. Similarly, the second element could also be termed the first element. In the present invention, the singular forms are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. Furthermore, when a first part such as a layer, a film, a region, or a plate is disposed on a second part, the first part may be not only directly on the second part but a third part may be interposed between them. To the contrary, when a first part such as a layer, a film, a region, or a plate is under a second part, the first part may be not only directly under the second part but a third part may be interposed between them.

Unless specified otherwise, since all numbers, values and/or expressions expressing quantities of components, reaction conditions, polymer compositions, and blends that are used herein are essentially approximations that reflect various uncertainties in the measurement that may occur in obtaining these values among others, it should be understood that these expressions are modified by the term "about". Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed herein, the range is continuous, and all values from a minimum value to a maximum value of this range are included unless otherwise indicated. Moreover, when this range refers to an integer, all integers from the minimum value to the maximum value of this range are included unless otherwise indicated.

Herein, when a range is stated for a variable, it is to be understood that the variable includes all values in the range including endpoints of the range. For example, it is to be understood that the range of "5 to 10" includes values of 5, 6, 7, 8, 9, and 10, any sub-ranges such as 6 to 10, 7 to 10, 6 to 9, or 7 to 9, and any values between the integers in the above-described range such as 5.5, 6.5, 7.5, 5.5 to 8.5 and 6.5 to 9. Furthermore, for example, it is to be understood that the range of "10% to 30%" includes all integers such as 10%, 11%, 12%, 13%, or 30%, any sub-ranges such as 10% to 15%, 12% to 18%, or 20% to 30%, and any values between the integers in the above-described range such as 10.5%, 15.5%, or 25.5%.

The present invention is directed to a method of manufacturing micro fiber and micro fiber manufactured through this method, and is characterized in that micro fiber having a controlled thickness is provided using hollow fiber.

Figure 1:
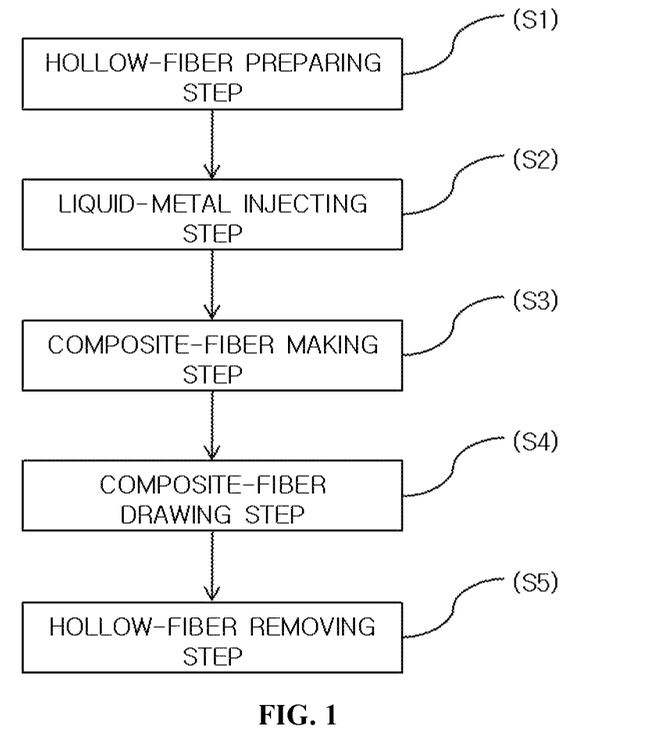
FIG. 1 shows an exemplary method of manufacturing an exemplary micro fiber according to an exemplary embodiment of the present invention.
Figure 2:
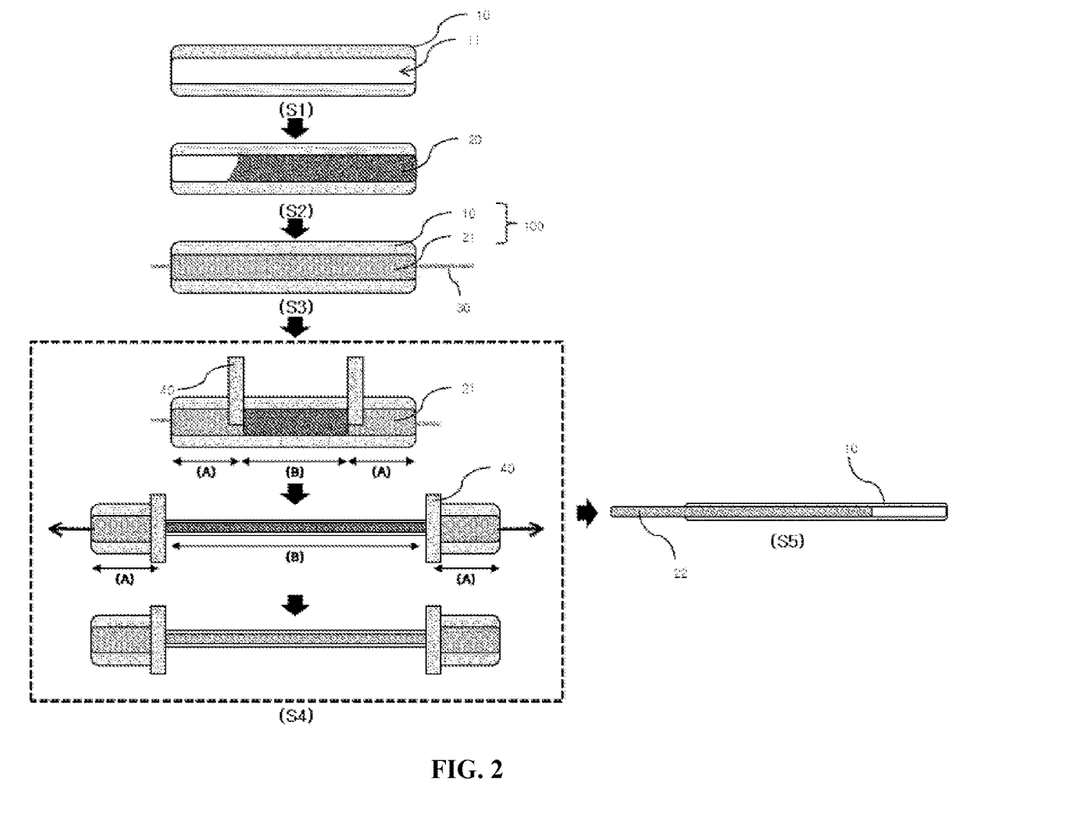
FIG. 2 shows processes of an exemplary method of manufacturing an exemplary micro fiber according to an exemplary embodiment of the present invention.

FIGS. 1 and 2 show a flowchart and a process chart of the method of manufacturing the micro fiber according to the present invention. As shown to FIGS. 1 and 2, respective steps of the manufacturing method of the present invention will be described, and then the micro fiber of the present invention will be described.

Method of Manufacturing Micro Fiber

The method of manufacturing the micro fiber may include a step of preparing hollow fiber, a step of injecting liquid metal into the hollow fiber, a step of forming a composite fiber by crystallizing the liquid metal to form metal wire, a step of drawing the composite fiber, and a step of removing the hollow fiber from the composite fiber. Each of the steps will be described with reference to FIGS. 1 and 2.

Step of Preparing Hollow Fiber (S1)

This is the step of preparing hollow fiber 10 that has a hole 11 therein.

The hollow fiber 10 may preferably contain silicone.

An inner diameter of the hollow fiber 10 may range from about 0.2 mm to about 0.7 mm, and an outer diameter thereof may range from about 1.0 mm to about 2.0 mm.

The elongation limit of the hollow fiber 10 may vary depending on the Young's modulus of the hollow fiber 10. The diameter and length of the manufactured metal wire 21 may vary.

The elongation limit means a maximum elongation at which the hollow fiber 10 may be drawn simultaneously with liquid metal 20 contained in the hole 11. In other words, in the case of exceeding the elongation limit, the hollow fiber 10 may be further drawn but the liquid metal 20 may be not drawn any more.

The Young's modulus of the hollow fiber 10 of the present invention may be about 0.5 MPa to 5.0 MPa, or particularly of about 0.5 MPa to 1.5 MPa. Here, when the Young's modulus of the hollow fiber 10 is about 1.6 MPa to about 4.0 MPa, the elongation limit of the hollow fiber 10 may be about 300% or less. When the Young's modulus of the hollow fiber 10 is about 0.5 MPa to about 1.5 MPa, the elongation limit may be about 500% or less. In other words, in the case of using the hollow fiber 10 that has a lower Young's modulus, the metal wire 21 having a relatively small diameter may be manufactured.

Step of Injecting Liquid Metal (S2)

This is the step of injecting the liquid metal 20 into the hollow fiber 10. The liquid metal 20 may be injected into the hole 11 of the hollow fiber 10.

The method of injecting the liquid metal 20 is not particularly limited. Preferably, the liquid metal may be simply injected using a syringe.

The hole 11 of the hollow fiber 10 may be filled with the liquid metal 20. The liquid metal 20 may be filled in the shape of the hole 11.

The melting point of the liquid metal 20 may be preferably about 30° C. or less, and the specific resistivity thereof may be about $2.0 \times 10^{-7}$ Ωm or less. When the melting point is greater than about 30° C., in a subsequent process of melting the metal wire 21, there may be a risk that the hollow fiber surrounding the outer surface of the metal wire 21 is deformed, and there may be a problem that the speed of the process is slowed down.

The injected liquid metal 20 may preferably be in a super-cooled state. In other words, the injecting process is performed at a melting point of the liquid metal 20 or less, but the liquid metal 20 may be maintained not in a solid state but in a liquid state.

The liquid metal 20 according to the present invention preferably includes gallium or alloy containing gallium.

Step of Making Composite Fiber (S3)

This is the step of crystallizing the injected liquid metal 20 to form metal wire 21 and thereby obtain composite fiber 100. In other words, the liquid metal 20 that is injected into the hole 11 of the hollow fiber 10 may be treated to completely fill the hole, thus solidifying the liquid metal.

A seed crystal may be inserted into the injected liquid metal 20, so that crystallization may be performed. In this case, a nucleus may grow based on the seed crystal, and the liquid metal 20 may be frozen from the liquid state to the solid state.

The seed crystal may be provided in the shape of copper wire 30 coated with the same metal as metal included in the liquid metal 20. For instance, when the liquid metal 20 includes gallium, the copper wire 30 coated with the gallium may be used.

The composite fiber 100 may have a core-sheath shape in which the metal wire 21 obtained by freezing the liquid metal 20 forms a core, and the outer surface of the metal wire 21 may be surrounded by the hollow fiber 10.

Preferably, the composite fiber 100 may include a core part containing the metal wire 21, and a sheath part containing the hollow fiber 10.

Step of Drawing Composite Fiber (S4)

This is the step of drawing the composite fiber 100 having the core-sheath shape. The composite-fiber drawing step may include a step of melting a part of the metal wire 21 other than both ends thereof, a step of pulling both ends that are not melted, thus stretching the metal wire 21, and a step of crystallizing the stretched metal wire 21. The melting step, the stretching step, and the crystallizing step of the composite-fiber drawing step will be separately described.

Melting Step

This is the step of melting a part of the metal wire 21 other than only both ends A of the metal wire 21 in the solid state corresponding to the core of the composite fiber 100 so as to draw the metal wire 21 to a desired length and thickness. The metal wire 21 may preferably be locally melted to a degree required for drawing.

The melting may be performed through any one of Joule heating in which a part is heated using heat generated from a conductor because of electrical resistance, induction heating in which a part is heated using high-frequency current of hundreds of thousands of hertz in a high-frequency electromagnetic field using the electromagnetic induction principle of high-frequency current, and body heating in which heat generated in the body by direct contact of the body is transferred to a contact part to heat the contact part. However, other heating methods may be applied as long as they may effectively melt a part of the metal wire 21. The heat transferred through the above-described method may be directly transferred to the metal wire 21, or may be transferred thereto through the hollow fiber 10 corresponding to the sheath.

The ends A of the composite fiber 100 may be parts of the composite fiber 100 which are fixedly supported by fixing members 40 so as to stretch the hollow fiber 10 and the metal wire 21, and the ends A correspond to parts at which the metal wire 21 is not melted. The part excluding the ends A corresponds to the melting part B, which is a part of the metal wire 21 which is melted.

In other words, the composite fiber 100 may include on both ends thereof the ends A of the metal wire 21 which are not melted, and the melting part B which is interposed between the ends A of the metal wire 21 to be melted.

Stretching Step

This is the step of stretching the metal wire 21 together with the hollow fiber 10 by pulling both ends A of the composite fiber 100. Force may be applied by the fixing members 40 secured to both ends A of the composite fiber 100, thus stretching the composite fiber 100 in opposite directions. Deformation may occur such that a diameter of the metal wire 21 corresponding to the melting part B may be reduced and a length thereof is increased. Likewise, deformation may occur such that a thickness of the hollow fiber 10 surrounding the metal wire 21 may be reduced and simultaneously a length thereof may be increased.

The composite fiber 100 may preferably be drawn by about 300% to 500%.

The diameter of the metal wire 21 included in the drawn composite fiber 100 may range from about 100 μm to about 700 μm.

The drawing of the composite fiber 100 may increase the length of the melting part B, but does not lead to a change in length of the end A.

Crystallizing Step

This is the step of crystallizing the increased metal wire 21.

The crystallization may be performed as follows: at contact points where the ends A and the melting part B meet on both ends of the metal wire 21, metal of the end A coming into contact with each contact point becomes seed crystal, and the liquid metal 20 is frozen around the seed crystal.

Preferably, the crystallization may further adopt the same method as the crystallization performed at the step S3 of making the composite fiber 100.

The Young's modulus of the drawn composite fiber 100 preferably may range from about 25 MPa to about 250 MPa.

Hollow-Fiber Removing Step (S5)

This is the step of removing the hollow fiber 10 included in the sheath part.

The method of removing the hollow fiber 10 is not particularly limited. For instance, the hollow fiber 10 may be removed through heat or solvent, or the metal wire 21 may slip and escape from the hole 11 of the hollow fiber 10 due to an oxygen film provided on an interface between the hollow fiber 10 and the metal wire 21.

Micro Fiber

The micro fiber 22 may be manufactured by the above-described manufacturing method. The micro fiber 22 may include the drawn metal wire 21 obtained by removing the hollow fiber 10 from the drawn composite fiber 100.

The diameter of the micro fiber 22 may range from about 100 μm to about 700 μm, and the Young's modulus of the micro fiber 22 may range from about 600 MPa to about 800 MPa.

EXAMPLE

Hereinafter, the present invention will be described in more detail with reference to specific examples. However, these examples are merely illustrative, and the scope of the present invention is not limited to these examples.

Experimental Example 1

Figure 3A:
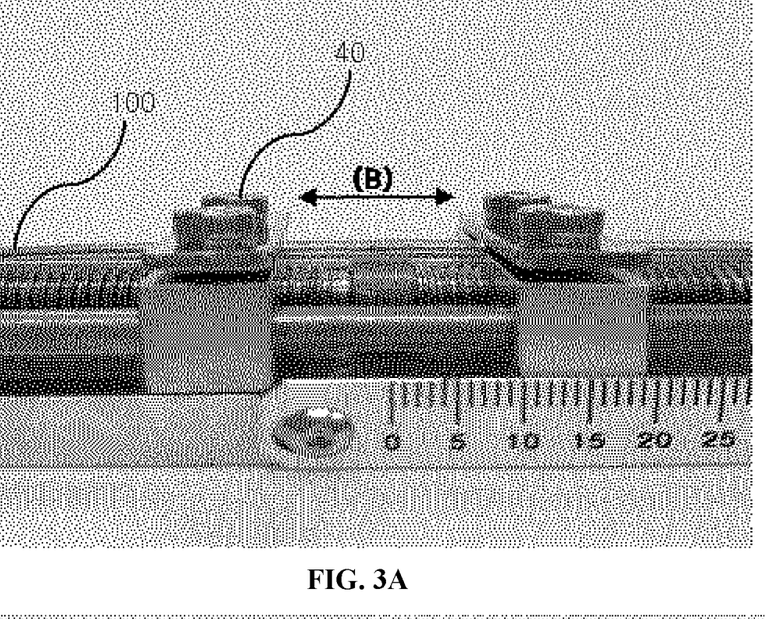
FIGS. 3A and 3B show the drawing result of experimental example 1.
Figure 3B:
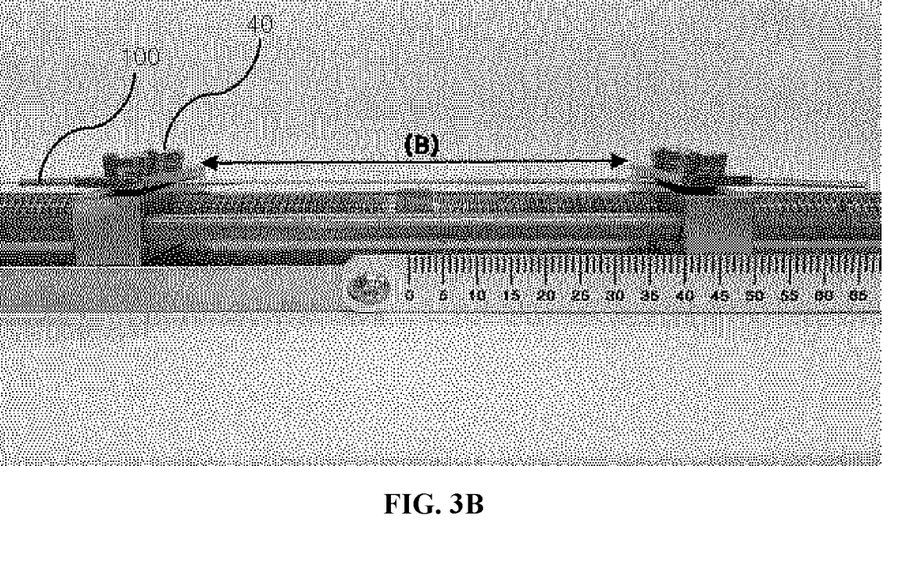

The core-sheath type composite fiber 100 including metal wire that has the diameter of 0.5 mm and contains gallium, and silicone hollow fiber that surrounds the metal wire and has the outer diameter of 1 mm, the inner diameter of 0.5 mm, and the Young's modulus of 1.0 MPa was prepared as shown in FIG. 3A, and then was secured to the fixing members 40. In this case, the length of the melting part B is about 2 cm. Heat at a temperature of 30° C. was transferred to the melting part B through finger contact, so that a part of the metal wire included in the melting part B was melted. Subsequently, as shown in FIG. 3B, the composite fiber 100 was drawn until the part of the metal wire included in the melting part B is stretched as far as possible without breaking through the fixing members 40.

The length of the drawn melting part B was about 8 cm and was stretched by 300% of an initial length.

Experimental Example 2

A core-sheath composite fiber having the following specification was prepared, and the composite fiber of experimental example 2 was drawn through the same process as that of experimental example 1.

Core part—gallium metal wire having the diameter of 0.5 mm

Figure 4:
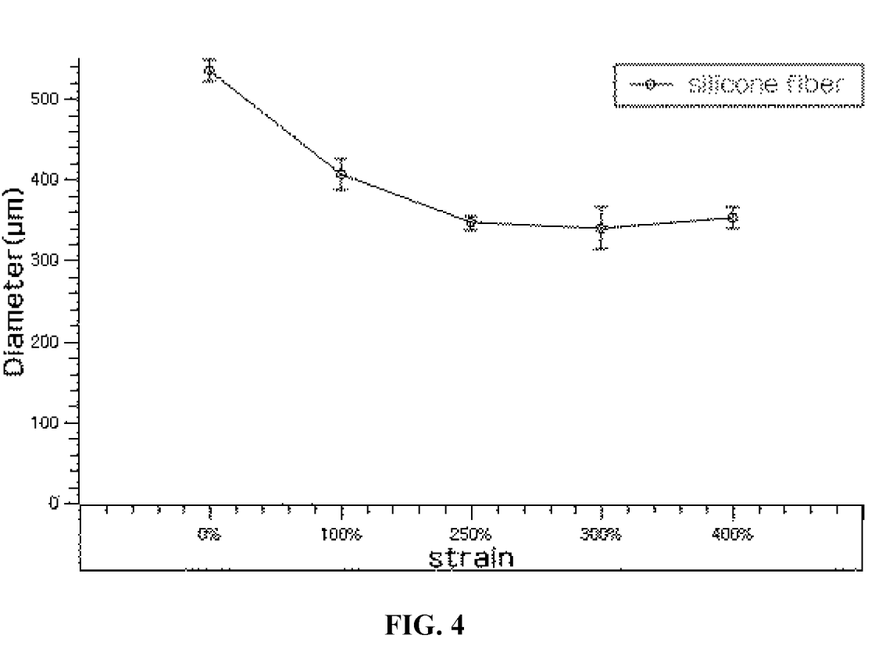
FIG. 4 is a graph showing results of experimental example 2.

Sheath part—silicone hollow fiber having the outer diameter of 1.8 mm, the inner diameter of 0.5 mm, and the Young's modulus of 4.0 MPa FIG. 4 shows a change in diameter of the gallium wire as the composite fiber is drawn. The melted gallium liquid metal included in the core part was not drawn, and only the hollow fiber of the sheath part was drawn, when the composite fiber was drawn by 300% or greater.

Experimental Example 3

A core-sheath composite fiber having the following specification was prepared, and the composite fiber of experimental example 3 was drawn through the same process as that of experimental example 1.

Core part—gallium metal wire having the diameter of 0.7 mm

Figure 5:
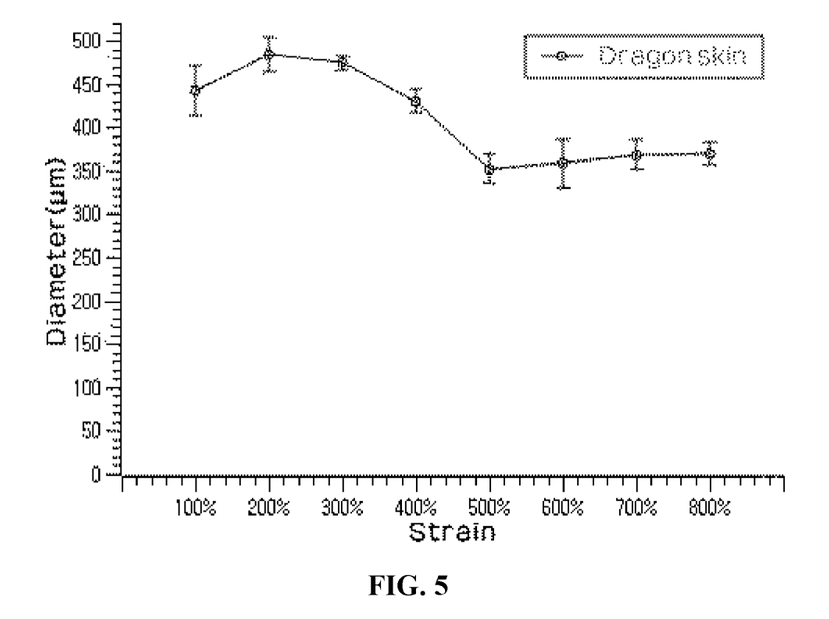
FIG. 5 is a graph showing results of experimental example 3.

Sheath part—silicone hollow fiber having the outer diameter of 1.8 mm, the inner diameter of 0.7 mm, and the Young's modulus of 1.5 MPa FIG. 5 shows a change in diameter of the gallium wire as the composite fiber is drawn and the diameter was no longer reduced above 500%.

As compared with the result of experimental example 2, the elongation limit when using the silicone hollow fiber of experimental example 3 was greater than that of experimental example 2.

Experimental Example 4

Experimental instrument: Lloyd instrument LRX plus
Tension speed: 3 mm/min
Initial length: 20 mm
Experimental subject: micro fiber (only the hollow fiber is removed from the composite fiber of experimental example 2), hollow fiber (hollow fiber used in experimental example 2), and composite fiber (composite fiber of experimental example 2)

Figure 6:
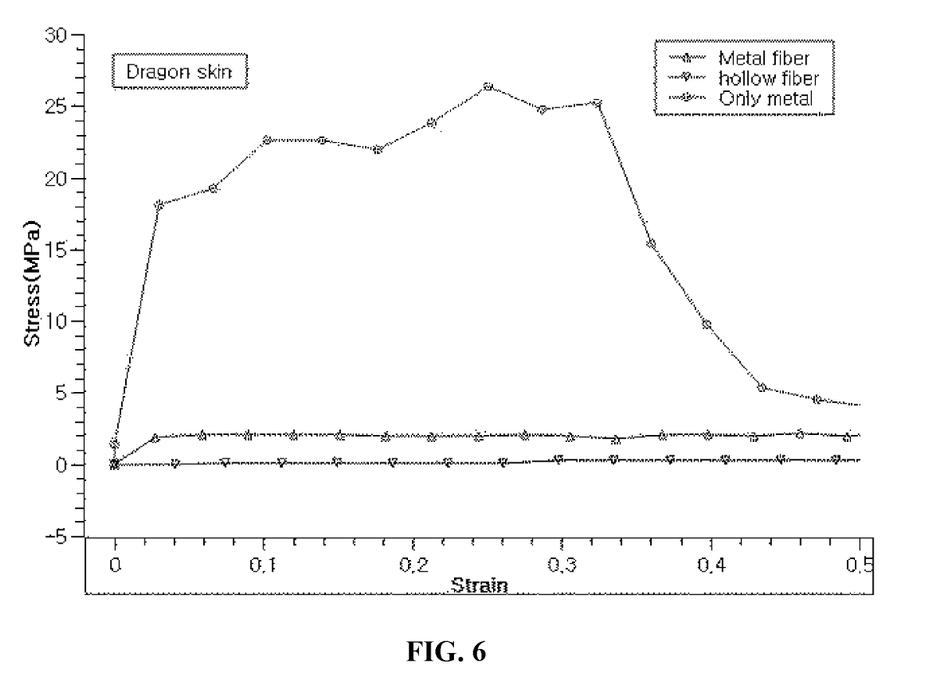
FIG. 6 is a graph showing results of experimental example 4.

Under conditions of room temperature and normal pressure, the micro fiber 22, the hollow fiber 10, and the composite fiber 100 were tensioned using UTM, and a change in modulus was observed. The result was shown in FIG. 6 and the composite fiber 100 was partially melted and tensioned in the same manner as experimental example 1. As shown in FIG. 6, the micro fiber 22 exhibited large Young's modulus, which means that it may be a brittle material, and may have a behavior similar to that of common metal. The composite fiber 100 had Young's modulus similar to that of the hollow fiber 10.

Although the present invention was described with reference to exemplary embodiments shown in the drawings, it is apparent to those skilled in the art that the present invention may be changed and modified in various ways without departing from the scope of the present invention, which is described in the following claims.

What is claimed is:

1. A method of manufacturing a micro fiber, the method comprising: preparing a hollow fiber;
injecting a liquid metal into the hollow fiber;
forming a composite fiber by crystallizing the liquid metal to form a metal wire to thereby obtain the composite fiber, wherein the composite fiber comprises a core part comprising the metal wire, and a sheath part comprising the hollow fiber;
drawing the composite fiber; and
removing the hollow fiber from the composite fiber,
wherein a Young's modulus of the hollow fiber ranges from about 0.5 MPa to about 1.5 MPa,
wherein, at the drawing of the composite fiber, the metal wire is locally melted and thereby the composite fiber is drawn.

2. The method of claim 1, wherein the hollow fiber comprises silicone.

3. The method of claim 1, wherein an inner diameter of the hollow fiber ranges from about 0.2 mm to about 2.0 mm.

4. The method of claim 1, wherein a melting point of the liquid metal is about 30° C. or less, and specific resistivity thereof is about $2.0 \times 10^{-7}$ Ωm or less.

5. The method of claim 1, wherein the liquid metal is injected into a hole of the hollow fiber.

6. The method of claim 1, wherein the injected liquid metal is in a super-cooled state.

7. The method of claim 1, wherein the liquid metal comprises gallium or alloy including gallium.

8. The method of claim 1, wherein a seed crystal is inserted into the injected liquid metal to perform crystallization.

9. The method of claim 1, wherein the drawing of the composite fiber comprises:
melting a part of the metal wire other than both ends thereof;
pulling the both ends to stretch the metal wire; and
crystallizing the stretched metal wire.

10. The method of claim 9, wherein the melting is performed through any one of Joule heating, induction heating, and body heating.

11. The method of claim 1, wherein a diameter of the metal wire included in the drawn composite fiber ranges from about 100 μm to about 700 μm.

12. The method of claim 1, wherein the composite fiber is drawn by about 300% to 500%.

* * * * *